United States Patent [19]

Hultermans

[11] Patent Number: 5,363,459

[45] Date of Patent: Nov. 8, 1994

[54] OPTICAL FIBER CONNECTOR INCLUDING A BIASING MEANS IN HOUSING

[75] Inventor: Antonius P. C. M. Hultermans, Tilburg, Netherlands

[73] Assignee: The Whitaker Corporation, Wilmington, Del.

[21] Appl. No.: 6,063

[22] Filed: Jan. 15, 1993

[51] Int. Cl.$^5$ .............................................. G02B 6/38
[52] U.S. Cl. ...................................... 385/60; 385/53; 385/72; 385/78; 385/86
[58] Field of Search ....................... 385/53, 55, 58, 60, 385/62, 72, 76, 77, 78, 81, 86, 87

[56] References Cited

U.S. PATENT DOCUMENTS

| | | | |
|---|---|---|---|
| 4,588,256 | 5/1986 | Onstott et al. | 385/87 |
| 4,687,288 | 8/1987 | Margolin et al. | 385/72 X |
| 4,726,647 | 2/1988 | Kakii et al. | 385/53 |
| 4,815,808 | 3/1989 | Honma et al. | 385/58 X |
| 4,898,446 | 2/1990 | Hinckley | 385/72 |
| 5,096,276 | 3/1992 | Gerace et al. | 385/76 |
| 5,202,942 | 4/1993 | Collins et al. | 385/86 X |
| 5,214,732 | 5/1993 | Beard et al. | 385/78 |

FOREIGN PATENT DOCUMENTS 2253278 9/1992 United Kingdom .

Primary Examiner—Rodney B. Bovernick
Assistant Examiner—Hemang Sunghavi
Attorney, Agent, or Firm—Eric J. Groen; Timothy J. Aberle

[57] ABSTRACT

An optical connector for coupling an optical fiber cable to another optical fiber cable or optical device. The optical fiber cable has an optical fiber for carrying an optical signal, and it also has a plurality of strain relief members. The optical connector comprises a barrel and ferrule having an optical fiber pre-mounted therein. The optical fiber from the optical fiber cable and the optical fiber are butt-spliced in a central part of the barrel. The optical connector further comprises a connector housing and a cylindrical sleeve member which is slidably mounted over a cable receiving end of the connector housing. The plurality of strain relief members are distributed around the cable receiving end, and the cylindrical sleeve member is guided therearound and then crimped thereon. The cylindrical sleeve member secures the plurality of strain relief members of the optical fiber cable directly to the connector housing.

7 Claims, 4 Drawing Sheets

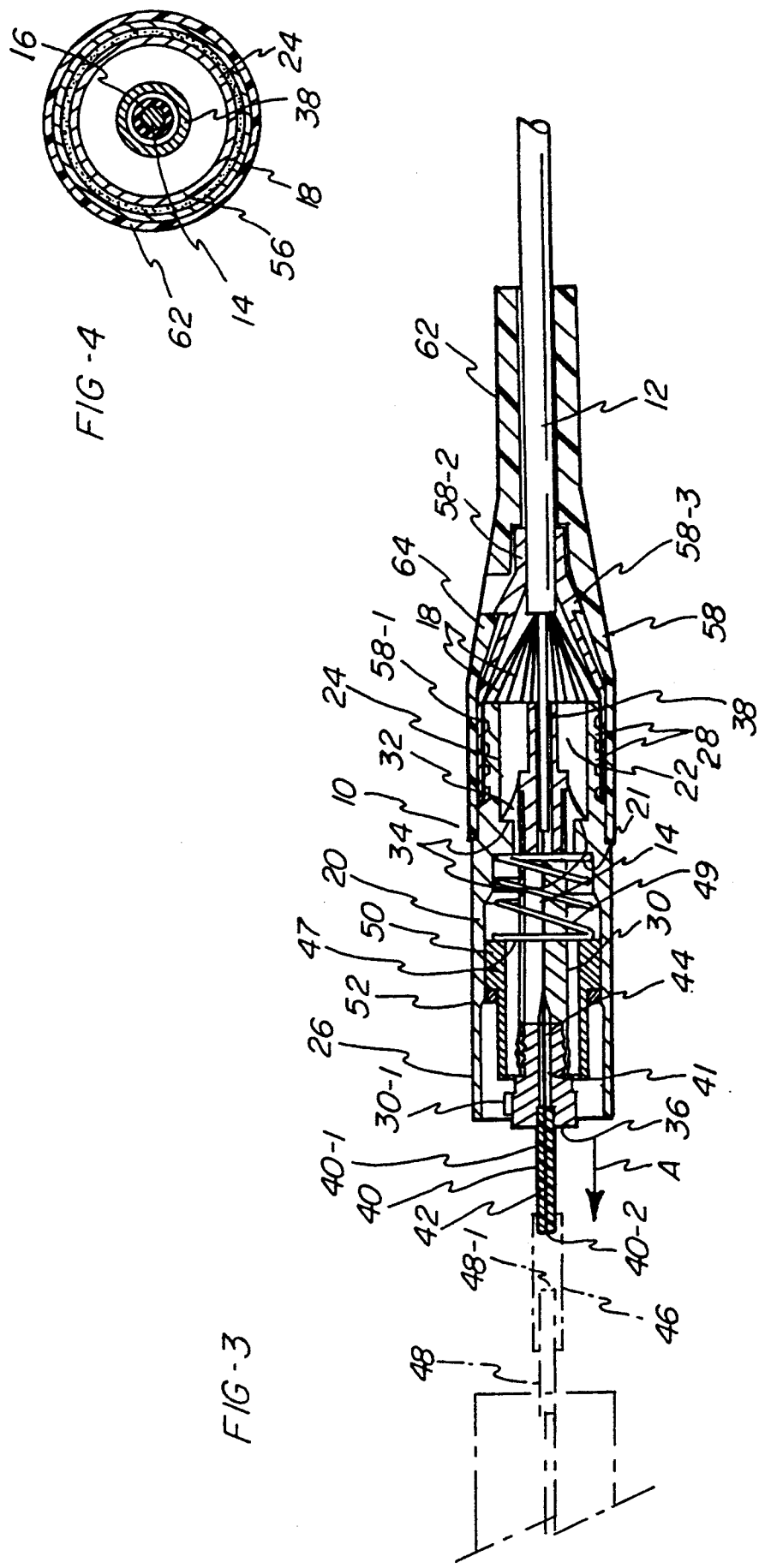

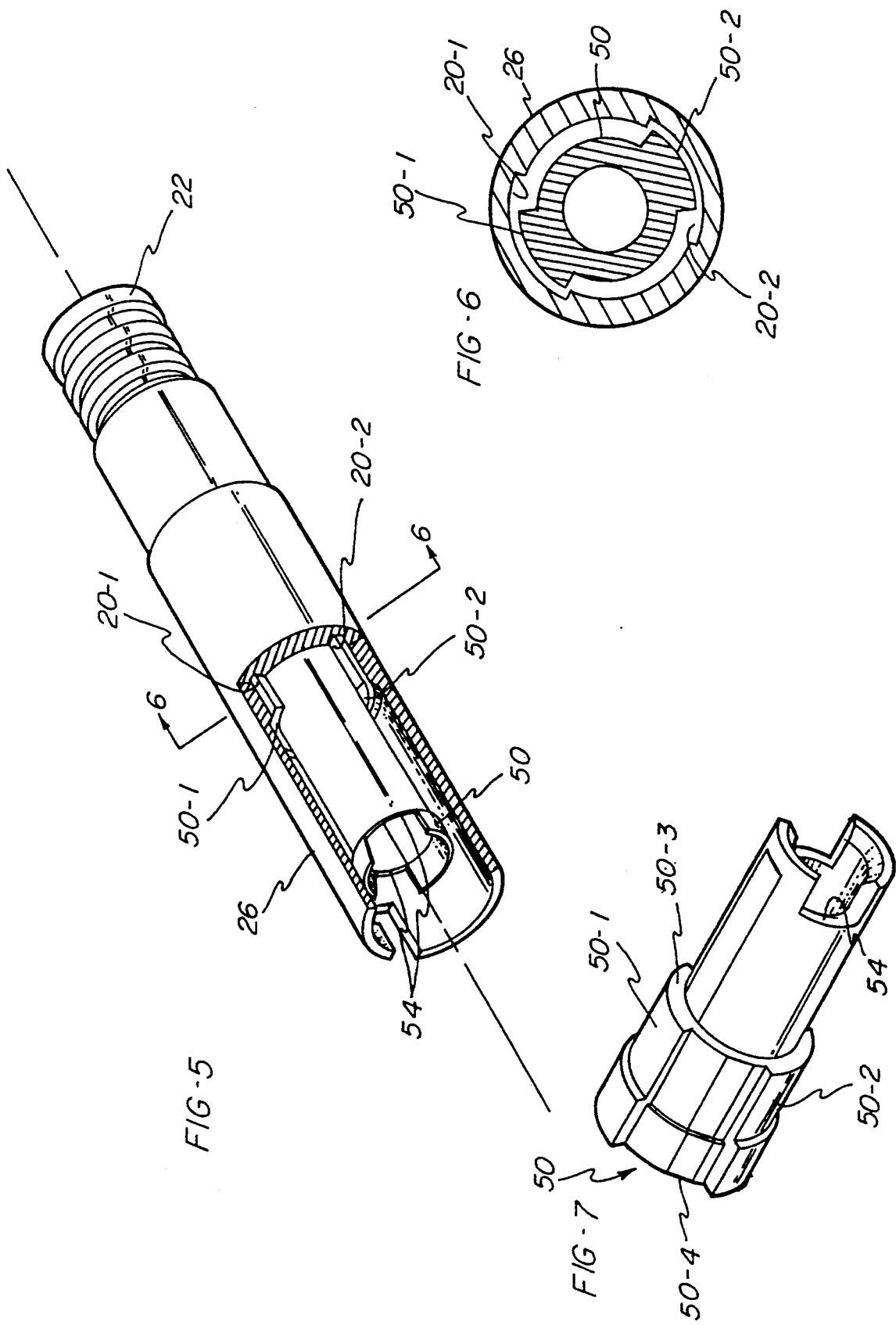

OPTICAL FIBER CONNECTOR INCLUDING A BIASING MEANS IN HOUSING

BACKGROUND OF THE INVENTION

1. Field of the Invention

The invention is directed to an optical fibre connector for splicing two optical fibres.

2. Description of the Prior Art

Optical fiber connectors are used to optically couple one optical fiber to either another optical fiber or an optical device, such as an LED, laser, or detector. One typical optical fiber connector for making an optical connection is referred to as a bayonet connector. The typical bayonet connector includes a connector housing having a barrel slidably mounted therein. The barrel has a ceramic, metal or plastic ferrule or plug, coupled to one end thereof. Each ferrule has a passageway extending longitudinally therethrough for receiving an end portion of the optical fiber. The barrel and ferrule are biased outwardly of the connector housing by a compression spring disposed about the barrel body. Connectors of this type are advantageous in that the ferrule plugs may be machined and polished to very close tolerances so that, when an end face of one ferrule engages an end face of another ferrule in a sleeve, for example, their respective passageways and optical fibers become coaxially aligned. The end faces of the ferrule plugs can be flat, or they can have a special shape (such as convex, slant or half-slant) which facilitates minimizing both power loss and reflection of light back into the transmitting fiber. Polishing the flat or special shapes requires special skills and equipment. In addition, the polishing of the flat or special shapes has to be performed with minimal roughness. If the passageways in the ferrules are not aligned, or the end faces of the ferrules are not flush, then the optical signal transmitted between the optical fibers becomes disturbed or lost.

A problem with the use of the bayonet connectors of this type relates to the potential for optical disconnection when the end face of the ferrule becomes disengaged from the end face of the ferrule in the optical connector or optical device. It will be recalled that the barrel and ferrule are biased outwardly by the compression spring. A typical optical fiber cable has strain relief strands associated therewith. In a typical bayonet connector, the strain relief strands are secured to the barrel. If sufficient force is applied to the optical fiber cable (for example, in the direction away from the optical connection), then the end faces of the ferrules will be pulled apart. This will cause the optical fibers to become disconnected and the optical connection terminated.

Another problem presented by bayonet connectors of the past is that they were not usually provided with premounted optical fibers. The user of the connectors had to mount the optical fiber from the optical fiber cable in the connector. The connectors had a passageway from the back of the connector to the front end of the ferrule. The customer had to put adhesive into this passageway and then insert the fiber from the optical fiber cable all the way through the connector until the optical fiber protruded out the front end of the ferrule. The user would conventionally cure the adhesive and then cleave the protruding portion of the fiber. The user would then grind and polish the optical fiber. All of these activities were time consuming and oftentimes required special skills and tools. It was not uncommon that the adhesive would be applied and cured improperly or the end face was polished or ground improperly, thereby making the connector unusable.

One optical fiber connector of the prior art is shown in U.S. Pat. No. 4,812,009, issued to Carlisle et al., on Mar. 14, 1989. This optical connector has a cap located near the end of an optical fiber cable. The cap has an extender which has one end threadably secured to the cap and a second end secured to the optical fiber cable. Thus, when bending forces applied to the cable were transferred at the location to the extender and then to the cap, the bending forces became transmitted through the extender to the cap. The problem with this design is its multi-piece construction which requires a cap and an extender which must be threadably secured to the cap. It is not uncommon that when these two pieces are threaded together, the optical fiber may become damaged.

SUMMARY OF THE INVENTION

It is, therefore, an object of this invention is to provide an optical connector which will facilitate maintaining an optical coupling when axial forces are applied to the optical fiber cable.

Another object of this invention is to provide an easy and efficient means of coupling an optical fiber cable to an optical connector.

Another object of this invention is to utilize the strain relief strands present in an optical fiber cable to couple the optical fiber cable to an optical connector so that any optical communication between the optical fiber cable and the optical connector will not be interrupted when transverse forces are applied to the optical fiber cable.

Another object of this invention is to provide an optical connector having a preinstalled fiber which facilitates easy mounting an optical fiber cable in the optical connector.

Another object of this invention is to provide an optical connector which eliminates the need for using adhesives in the field when an optical fiber from an optical fiber cable is mounted therein.

Yet another object of this invention is to provide means for utilizing the yarnlike strain relief strands to secure the optical fiber cable to the housing of the optical connector.

Other objects and advantages of this invention will be apparent from the following description, the accompanying drawing, and the appended claims.

DESCRIPTION OF THE DRAWINGS

FIG. 3 is a view, partially in section, of the optical connector, shown in FIG. 1, showing the various other components of the optical connector;

FIG. 4 is a sectional view taken along the line 4—4 of FIG. 1;

FIG. 5 is a fragmentary view, partially broken away showing the positioning of an engaging member mounted in the optical connector;

FIG. 6 is a sectional view taken along the line 6—6 in FIG. 5, showing a pair of slots in the housing for receiving a first notch and a second notch on the barrel; and FIG.. 7 is an isometric view of the engaging member.

DETAILED DESCRIPTION OF THE PREFERRED EMBODIMENT

Figure 1:
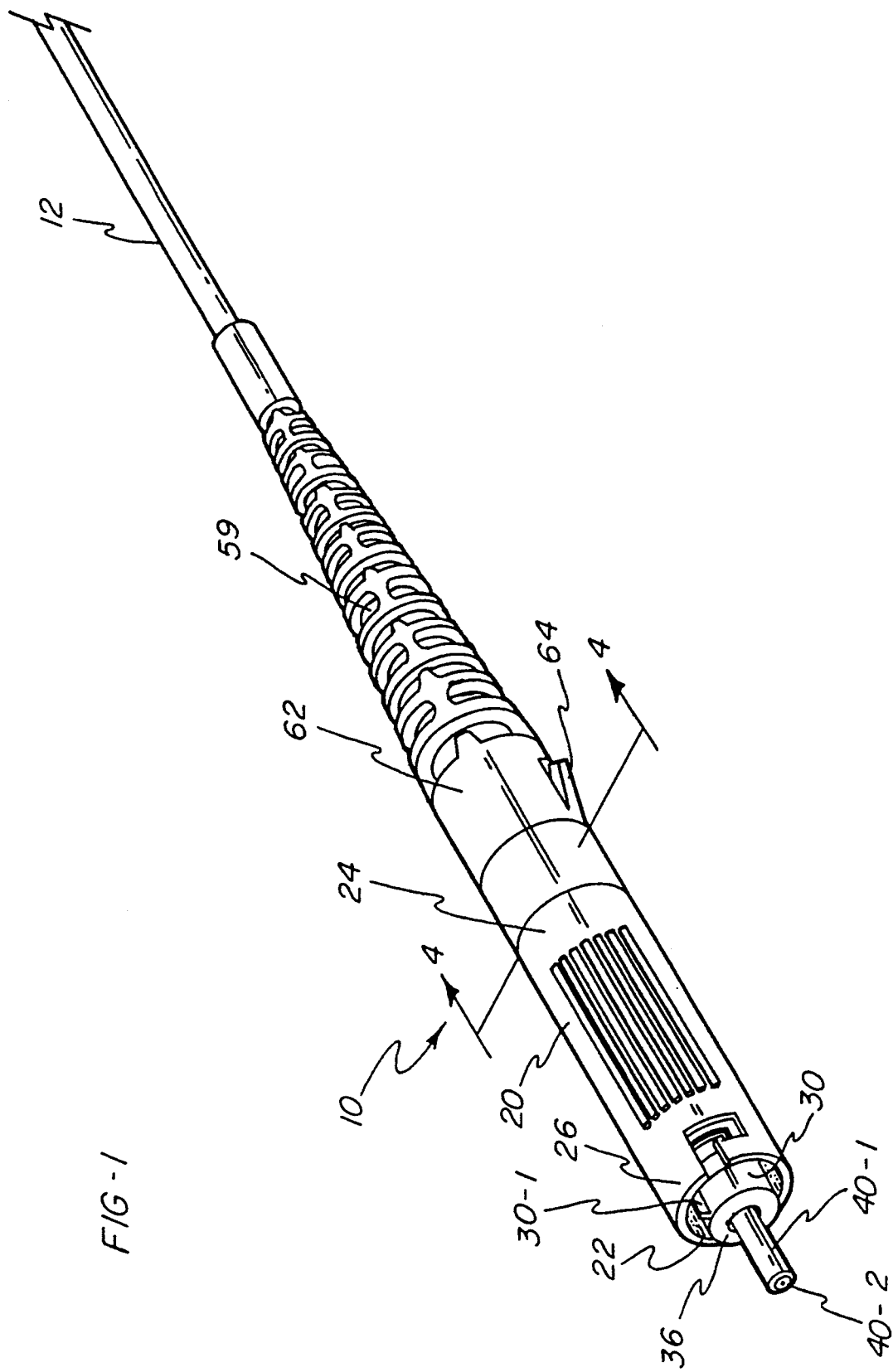
FIG. 1 is an assembled view of the optical connector according to one embodiment of the present invention.
Figure 2:
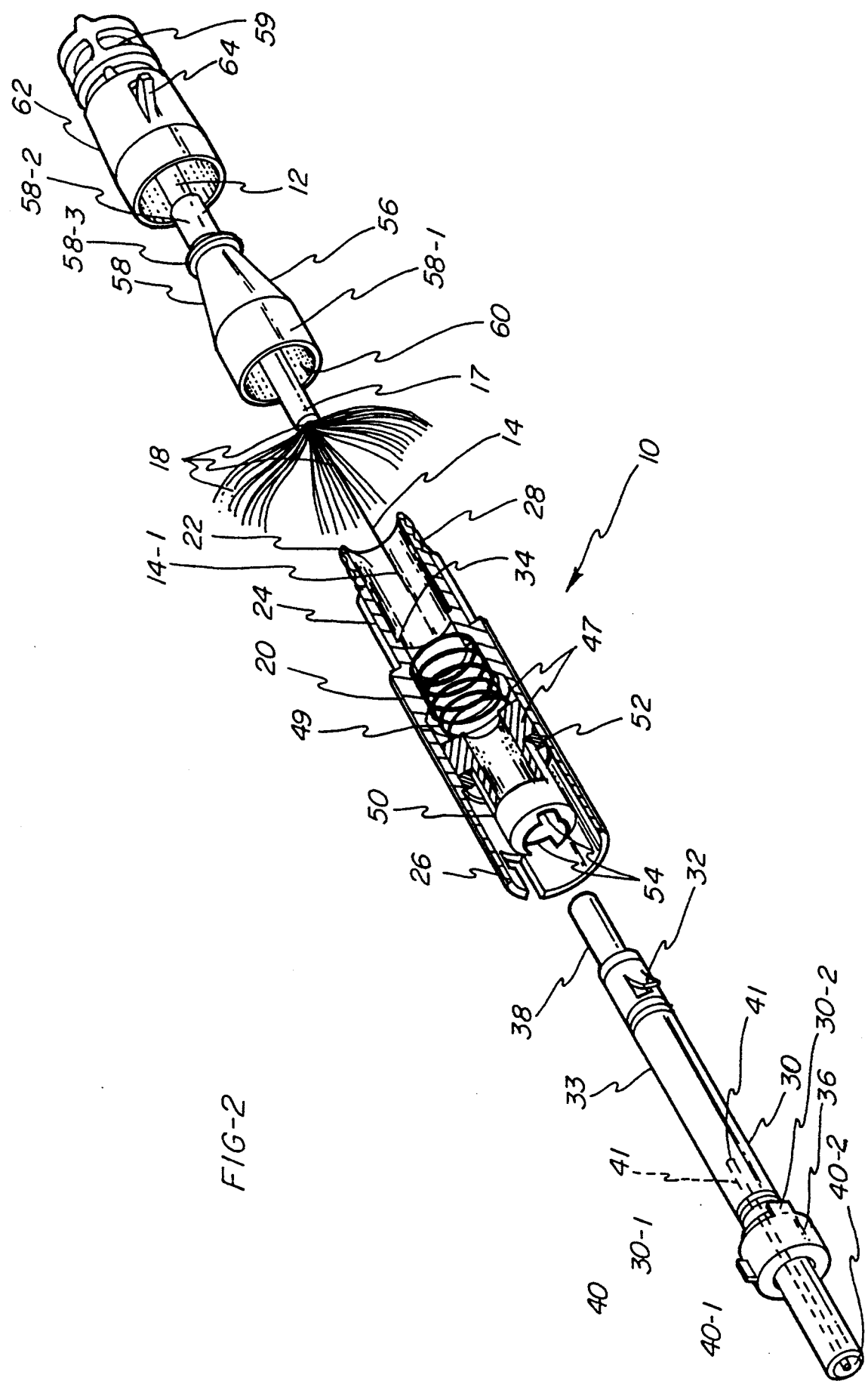
FIG. 2 is an exploded view, partially in section, of the optical connector as shown in FIG. 1.

FIG. 1 is a perspective view of an optical connector, hereinafter optical connector 10, according to the present invention. The function of the optical connector 10 is to couple an optical fiber cable 12 to an optical device (not shown), such as another optical connector, a terminal, or any other device which is capable of being connected to the optical connector 10. As best illustrated in FIGS. 2 and 4, the optical fiber cable 12 houses an optical fiber 14 having a buffer 16, such as a polyamide buffer, and a cover 17 therearound. The optical fiber 14 also has a coating, such as an acrylic coating (not shown), thereon to facilitate mounting the optical fiber 14 in the optical connector 10. The optical fiber cable 12 comprises a strain relief or plurality of strain relief members or strands 18 which surround the optical fiber, as shown in FIGS. 2 and 3. In the preferred embodiment, the optical fiber 14 has a diameter of 125 micrometers and is suitable for carrying an optical signal.

As best shown in FIG. 2, the optical connector 10 comprises a forward connector housing 20, a fibre receiving barrel 30, an inner engaging portion 50, a crimp sleeve member 58, and a rear strain relief section 62. The connector housing 20 has a passageway 22 extending entirely through the housing for receiving the fibre cable therethrough. The connector housing 20 is generally cylindrical and has a rear cable receiving end 24 for receiving the optical fiber cable 12. The connector housing 20 also has a front mating end 26 for coupling the optical connector 10 and optical fiber 14 to another optical connector (not shown) or optical device (not shown). As illustrated in FIG. 2, the cable receiving end 24 is inwardly stepped and has an outer periphery containing a ribbed portion 28 which facilitates securing the plurality of strain relief members 18 thereon, as described in greater detail herein.

The connector 10 further comprises an engaging section 50 shown best in FIGS. 2 and 7. The engaging section 50 comprises a forward end having notches or slots 54 and rotational lugs 50-1 and 50-2, which will be described in greater detail herein. The engaging section further comprises a forwardly directed face 50-3 and a rearwardly directed face 50-4.

The fibre receiving barrel 30 is slidably receivable into the housing 20 and is secured therein by a plurality of resilient lances 32 (FIG. 3) which engage an inner shoulder 34 within the housing 20. The barrel 30 has a first end 36 and a second end 38. A ferrule 40 is secured in the first end 36, as illustrated in FIG. 3. The ferrule 40 and the barrel 30 have coaxially aligned passageways 42 and 44, respectively, therethrough. As shown in FIG. 2, the ferrule 40 and barrel 30 have an optical fiber 41 mounted in the passageway 42 and 44 to about midway in the barrel 30. In the embodiment being described, the ferrule 40 is precisely machined on its side 40-1 and end face 40-2 so that it can be precisely aligned, for example, in a sleeve 46 (shown in phantom in FIG. 3) so that it will properly mate with an end face 48-1 of another connector. In a preferred embodiment, the barrel 30 has a central part 33 (FIG. 2) which may be crimped in order to butt splice the optical fiber 14 to the optical fiber 41 (shown in phantom in FIG. 2). One suitable central part 33 which is suitable for butt splicing the optical fibers 14 and 41 is disclosed in U. S. Pat. No. 4,435,038 which issued to Soes et al. on Mar. 6, 1984 and which is hereby incorporated by reference and made a part hereof.

With respect now to FIG. 3, the optical connector 10 further comprises biasing means 47 for resiliently biasing the ferrule 40 in the direction of arrow A in FIG. 3 when the connector end 26 is coupled thereto. In a preferred embodiment, the biasing means 47 comprises a spring 49 medially positioned between the engaging member 50 and an inner shoulder 21 (FIG. 3) thereby resiliently biasing the engaging member 50 against a retaining washer 52. Although not shown, the biasing means 47 could be any type of spring or any other suitable means 47 for biasing the ferrule 40 in the direction of arrow A in FIG. 3. After the barrel 30 has been inserted in the connector housing 20, the spring 49 becomes disposed about the barrel 30, as shown in FIG. 3. It is to be noted that the forward end of the barrel 30 has a key 30-1 thereon which facilitates keying the optical connector 10 to another optical connector (not shown) or to an optical device (not shown). The opposing slots 54 on the engaging member 50 cooperate with a pair of keying members 30-2 (FIG. 2) on the barrel 30 to correctly align the ferrule 40. The alignment lugs 50-1 and 50-2 of the engaging member 50 cooperatively engage first and second slots 20-1 and 20-2, respectively, in the connector housing 20. The first and second members 50-1 and 50-2 cooperate with the first and second slots 20-1 and 20-2 to allow enough rotational movement of the housing 20 (FIG. 6) for matably locking the connector 10 to a mating connector but restricts the rotational movement of the barrel 30 in order to prevent breaking the optical fiber 14.

The optical connector 10 also comprises securing means 56 for securing the plurality of strain relief members 18 to the cable receiving end 24 of the connector housing 20. As described later herein, securing the plurality of strain relief members 18 directly to the connector housing 20 facilitates maintaining an operative relationship between ferrules 40 and 48 when axial forces are applied to the optical fiber cable 12 at the cable receiving end 24 of the connector housing 20. As best shown in FIG. 2, securing means 56 comprises a cylindrical sleeve member 58 having an aperture 60 therethrough for permitting the optical fiber cable 12 to pass therethrough. As illustrated in FIGS. 2-4, the sleeve member 58 cooperates with the cable receiving end 24 to secure the plurality of strain relief members 18 therearound. As mentioned previously herein, the cable receiving end 24 has the ribbed portion 28 which facilitates securing the plurality of strain relief members 18 around the cable receiving end 24. Although not shown, the securing means 56 could include a ring, an adhesive, or any other suitable means capable of securing the plurality of strain relief members 18 to the cable receiving end 24.

In a preferred embodiment, the optical connector 10 also comprises a second strain relief member 62 which is mounted around the cylindrical sleeve member 58 and the connector end 26 as shown. The second strain relief member 62 is a one-piece rubber molded construction, and it facilitates preventing the optical fiber cable 12 from being bent or severed at the end 58-2 of the cylindrical sleeve member 58. The molded apertures 59 in the second strain relief member 62 prevent the cable from being bent in sharp angles which would damage the optical fiber 14. As illustrated in FIG. 2, the cylindrical sleeve member 58 has a ridge 58-3 therearound. A resilient latch 64 molded into the second strain relief member 62 cooperates with the ridge 58-3 to secure the strain relief member 62 to the optical connector housing 20, as best shown in FIG. 3. The assembly and operation of the optical connector 10 will now be described.

The optical fiber cable 12 is guided through the strain relief member 62, cylindrical sleeve member 58 and the passageway 22 of the connector housing 20. A user then prepares the optical fiber cable 12 for connecting to the optical connector 10 by stripping the cover 17 (FIG. 2), cutting the strain relief members 18 a predetermined length, stripping the buffer 16 and the coating (not shown). The user then cleaves an end 14-1 (FIG. 2) of the fiber 14 with a cleaving tool (not shown), dips the end 14-1 into an index matching gel (not shown) and then guides the end 14-1 into the second end 38 until the end 14-1 engages the optical fiber 41 which is premounted in the barrel 30. Alternatively, the index matching gel could be incorporated into the connector, such that the fiber end must only be inserted. The user then uses a crimp tool (not shown) to deform and crimp the central part 33 of the barrel 30 in the manner described in U.S. Pat. No. 4,435,038, thereby splicing the optical fiber 14 to the optical fiber 41. The user also deforms the second end 38 of the barrel 30 in order to secure the buffer 16 to the barrel 30. The crimped barrel 30 is then moved relative to the connector housing 20 until the resilient detents 32 engage the shoulder 34 and the keying members 30-2 on the first end 36 are received in the slots 54.

After the barrel 30 is mounted inside the connector housing 20, the plurality of strain relief members 18 are guided around the ribbed portion 28 of the receiving end 24. The cylindrical sleeve member 58 is then slid over the strain relief members 18, trapping them against the ribbed portion 28 of the receiving end 24. The cylindrical sleeve member 58 is then crimped at its first end 58-1, thereby securing the strain relief members directly to the connector housing 20. The cylindrical sleeve member 58 is then crimped at its second end 58-2, thereby securing the cylindrical sleeve member to the optical fiber cable 12. The second strain relief member 62 is then slid over the cylindrical sleeve member 58 and cable receiving end 24 of the connector housing 20 until the latches 64 engage the ridge 58-3 on the cylindrical sleeve member 58, as best seen in FIG. 3.

The invention described herein provides an advantageous apparatus and method for coupling the optical fiber cable 12 to an optical connector 10 by coupling the plurality of strain relief members 18 to the connector housing 20 so that the optical coupling between the mating fibres is uninterrupted when axial forces are applied to the optical fiber cable 12. As shown and described herein, by evenly distributing the plurality of strain relief members 18 (FIG. 4) about the cylindrical cable receiving end 24, the optical fiber cable 12 becomes secured to the connector housing 20 by cylindrical sleeve 58. By crimping barrel 30, fiber 12 is aligned and fixed to the pre-mounted fiber 41. The strain relief members 18 facilitate relieving strain from axial forces so that no decoupling will take place. This optical connector 10 facilitates maintaining the communication of any optical signal between the connector 10 and another connector or other optical device (not shown) which is capable of receiving the communication. Any axial forces that are applied to the optical fiber cable 12 (for example, in the direction opposite that of arrow A in FIG. 3) will be transferred to the connector housing 20. The biasing means 47 will bias the ferrule 40 to remain in engagement with the ferrule 48 or other optical device (not shown) so that any optical communication transmitted between the optical fiber 14 and the optical fiber 41 will not be interrupted or lost.

While the apparatus herein described constitutes the preferred embodiment of this invention, it is to be understood that the invention is not limited to this precise form of apparatus. For example, although the optical connector 10, connector housing 20, cylindrical sleeve member 58, strain relief member 62, barrel 30, and ferrule 40 have been described or shown herein as being generally cylindrical, they could be rectangular in cross-section or any other shape which is capable of achieving the objects described earlier herein. Thus, changes may be made to the apparatus without departing from the true spirit and scope of the invention, which is defined in the appended claims.

What is claimed is:

1. A connection between an optical fiber cable having a first optical fiber and an optical connector for connection to an optical device, said connector comprising:

(a) a housing having a barrel therein, the barrel being axially reciprocable relative to the housing, said barrel having a ferrule secured to a first end thereof, and said barrel including an outwardly directed projection at a second end thereof, said barrel and said ferrule being capable of receiving an optical fiber therein;

(b) a biasing means in said housing for biasing said ferrule towards the optical device; and (c) wherein said housing includes an annular projection formed thereon and having opposing side surfaces for contact with biasing means on one side surface, and for contact with the barrel projection on the opposing side surface.

2. The connection as recited in claim 1 wherein a strain relief member is associated with the optical fiber cable.

3. The connection as recited in claim 1 wherein said barrel is capable of splicing said first optical fiber to a second optical fiber, said second optical fiber being premounted in said ferrule and said first end of said barrel.

4. The connection as recited in claim 1 wherein the barrel includes a crimped portion which surrounds said fiber.

5. The connection as recited in claim 1 wherein an engaging member transmits axially directed forces from the biasing member to the barrel.

6. The connector of claim 1, wherein said housing includes a cable receiving end having a ribbed end for receiving a strain relief member.

7. The connector of claim 1, wherein the housing includes an engaging member for engagement with the biasing member.

* * * * *